(12) United States Patent
Beninga

(10) Patent No.: US 6,341,619 B1
(45) Date of Patent: Jan. 29, 2002

(54) DEVICE FOR SUBSEQUENTLY INSTALLING A FLUID METER IN A PIPELINE

(76) Inventor: Ewald Beninga, Unterschweinssteige 4, 60549 Frankfurt (DE)

( * ) Notice: Subject to any disclaimer, the term of this patent is extended or adjusted under 35 U.S.C. 154(b) by 0 days.

(21) Appl. No.: 09/647,186

(22) PCT Filed: Mar. 22, 1999

(86) PCT No.: PCT/EP99/01904

§ 371 Date: Sep. 27, 2000

§ 102(e) Date: Sep. 27, 2000

(87) PCT Pub. No.: WO99/50584

PCT Pub. Date: Oct. 7, 1999

(30) Foreign Application Priority Data

Mar. 31, 1998 (DE) .......................... 198 14 341

(51) Int. Cl.[7] .......................... F16K 43/00; F16L 37/47; F16L 55/134
(52) U.S. Cl. .......................... 137/318; 73/201; 138/93; 138/94; 138/97
(58) Field of Search .................. 73/198, 201; 137/317, 137/318; 138/97, 93, 94

(56) References Cited

U.S. PATENT DOCUMENTS

| | | | | |
|---|---|---|---|---|
| 265,327 A | * | 10/1882 | Jonson | 73/201 |
| 854,882 A | * | 5/1907 | Gamon | 73/201 |
| 953,505 A | * | 3/1910 | Bassett | 73/201 |
| 1,122,967 A | * | 12/1914 | Mass | 73/201 |
| 2,863,317 A | * | 12/1958 | Rings | 73/201 |
| 2,899,983 A | * | 8/1959 | Farris | 137/318 |
| 3,948,282 A | * | 4/1976 | Yano | 138/89 |
| 5,303,583 A | * | 4/1994 | Harris | 73/201 |

FOREIGN PATENT DOCUMENTS

| | | |
|---|---|---|
| BE | 1004967 | 3/1993 |
| DE | 3242763 | 5/1984 |
| DE | 3541436 | 6/1987 |
| DE | 3627393 | 11/1987 |
| EP | 0327972 | 8/1989 |
| EP | 0344777 | 12/1989 |
| NL | 9401549 | 5/1996 |

OTHER PUBLICATIONS

Patent Abstracts of Japan, vol. 016, No. 203 (M–1247), May 14, 1992 & JP 04029696 A (Osaka Gas), Jan. 31, 1992.

* cited by examiner

*Primary Examiner*—George L. Walton
(74) *Attorney, Agent, or Firm*—Friedrich Kueffner

(57) ABSTRACT

The invention relates to devices for retrofitting a pipeline (1, 1') which is under pressure with a fluid meter (2).

Figure 1:
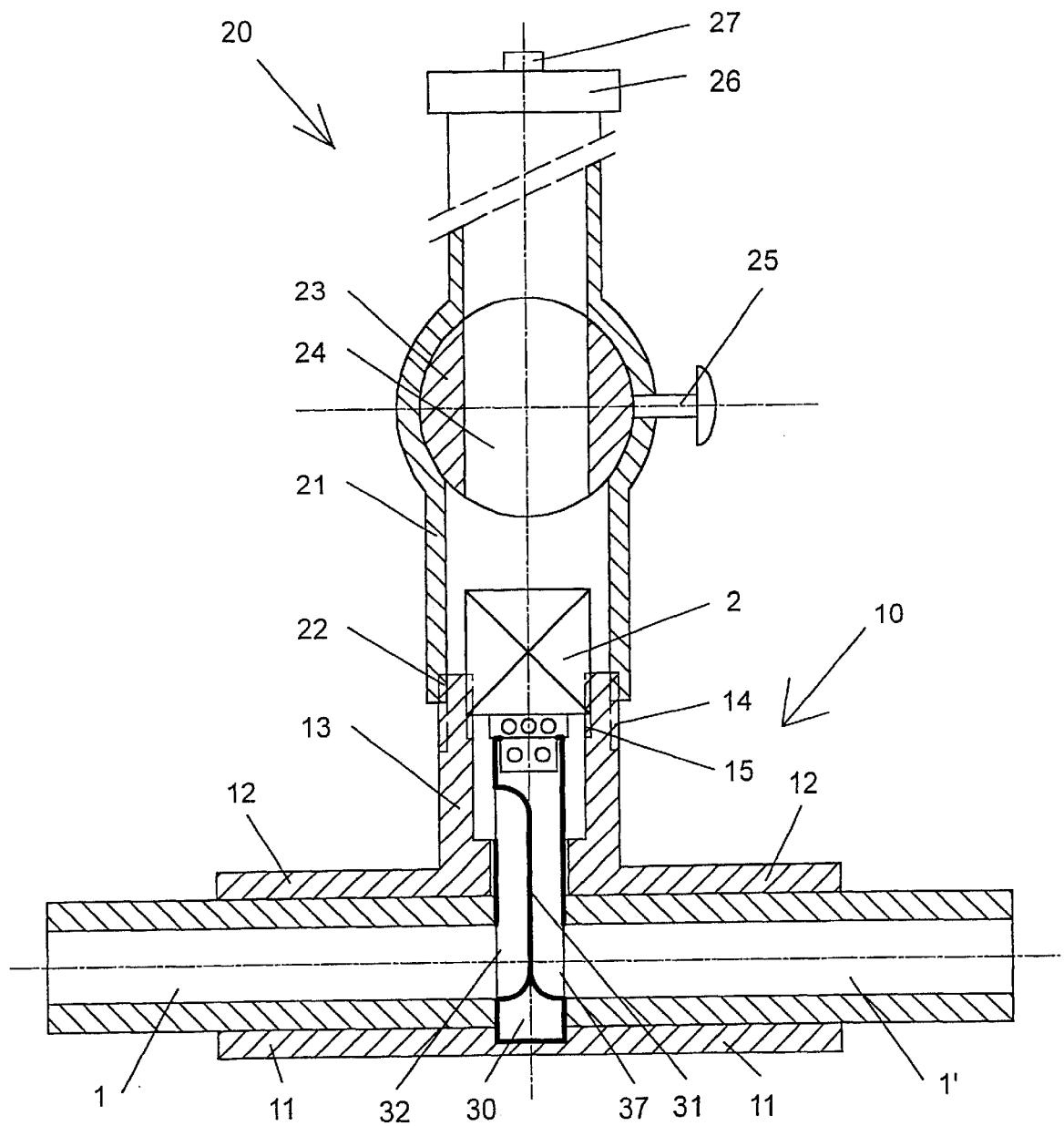

The device comprises a branch fitting (60) with two sealing sockets (61, 62) placeable in a fluid-tight manner on the pipeline (1, 1') and a branch socket (63). The branch socket (63) has an outer thread (64) onto which a lock fitting can be seal-tightly screwed. After opening the pipeline (1, 1') by milling, a flow-guiding insert (50) is inserted into the branch socket (63) in a seal-tight manner which guides the fluid out of the pipeline (1) and returns it again into the pipeline (1') after it has flown through the fluid meter (2). A temperature sensor (7, 8) can be inserted into the branch socket (63). By means of bladders (66.1, 66.2), which can be inflated by means of a fluid, the fluid flow through the branch socket (63) can be shut off.

The device according to the invention finds its application in gas, water, and heating installations.

19 Claims, 4 Drawing Sheets

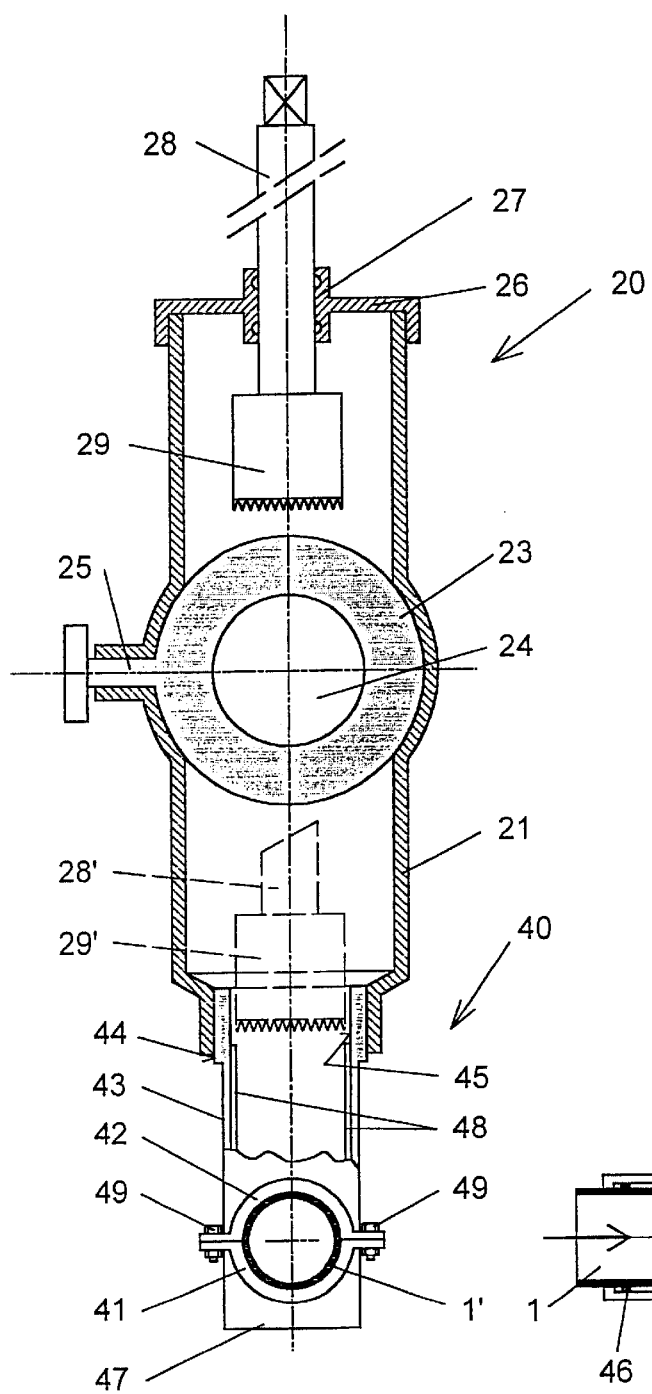
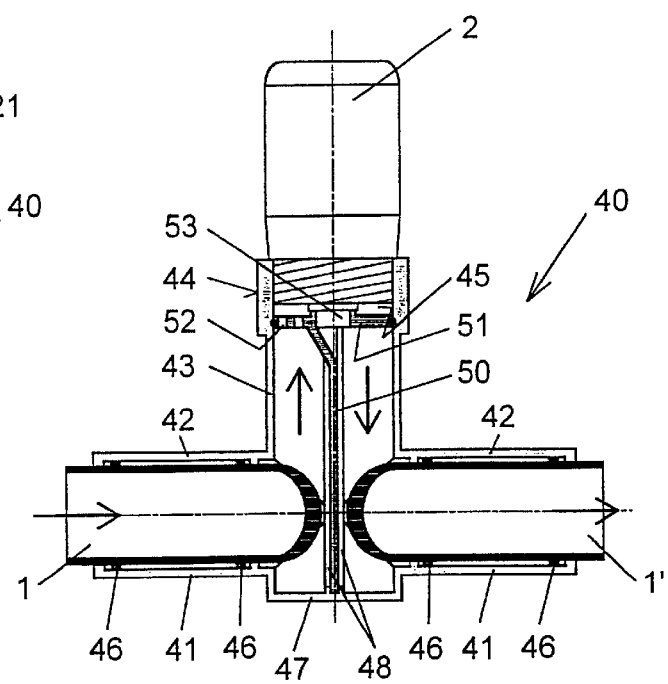
Fig.3 Fig.4

DEVICE FOR SUBSEQUENTLY INSTALLING A FLUID METER IN A PIPELINE

BACKGROUND OF THE INVENTION

1. Field of the Invention

The invention relates to devices [according to the preamble of claim 1] for subsequently installing a fluid meter in a pipeline which is under pressure.

2. Description of the Related Art

From EP-A 344 777, DE-C 36 27 393 or DE-A 32 42 763 devices are known with which a fluid meter, for example, a water meter, can be retrofitted in a pipeline. A precondition for this is that a T-piece of a shut-off valve is already present in the pipeline. After unscrewing the valve hand, a branch fitting is screwed onto the T-piece on whose upper side the fluid meter is seated. In the interior of the branch fitting an insert is provided which guides the fluid out of the pipeline and, after it has passed through the fluid meter, returns it into the pipeline.

The precondition for the use of these so-called valve meters is that in the pipeline there is already a T-piece of a shut-off valve. In the case that such a shut-off valve is not present, the subsequent installation of a fluid meter is only possible with elaborate stamping, cutting, welding and soldering work. In both cases the fluid line must be shut off and emptied. This is unsatisfactory.

SUMMARY OF THE INVENTION

The present invention has therefore the object to provide a device of the aforementioned kind which makes it possible to retrofit fluid meters even when no T-piece is present and the fluid line is under pressure.

This object is solved by a device for retrofitting a fluid meter into a pipeline that is under pressure includes a branch fitting with a branch socket, a flow-guiding insert for guiding the fluid out of the pipeline into the fluid meter and for returning the fluid into the pipeline, and a branch socket with an inner thread corresponding to a thread on the fluid meter. The branch fitting has two ceiling sockets which can be placed on the pipeline in a fluid type manner and which are longitudinally divided along the pipeline. The branch socket has an outer thread, wherein a lock fitting can be tightly screwed onto the outer thread. The lock fitting is composed of a cylinder socket and a shut-off device with a ball valve having an opening mounted in the cylinder socket. The lock fitting further has a removable lid with a guide socket and a rotatable actuation rod extending through the guide socket and being liftable and lowerable through the opening of the ball valve when the ball valve is in an open position. The actuation rod can be selectively connected to a milling head for drilling into and drilling through the pipeline, or a securing device for holding the fluid meter during its mounting or demounting.

Tapping stop valves with whose aid connecting locations can be retrofitted in pressurized gas and water lines have been known for more than 100 years. Compare, for example, U.S. Pat. No. 463,524, DE-U 93 16 819, DE-U 74 10 858, DE-A 25 15 235 or GB 13 67 074. All of these tapping stop valves have adjacent to the drilled pipeline a shut-off element. According to U.S. Pat. No. 463,524, this is a parallel slide gate valve, while in the newer documents generally a ball valve is provided. Despite certain similarities between the device according to the invention and the tapping stop valves of the prior art, the known tapping stop valves are not suitable for the use according to the invention.

The invention makes it possible to retrofit any fluid line, independent of whether it is buried or freely accessible, with a fluid meter without having to shut off the fluid line and empty it.

A further advantage of the device according to the invention is that it can be used also to exchange the fluid meter after expiration of the legal calibration period, also without having to shut off the pipeline and empty it.

According to one embodiment of the invention the material of the branch fitting is matched to that of the pipeline. With this measure it is possible to prevent stress corrosion. The main reason for this measure is, however, the electrical connection between pipeline and fitting required in a predominant number of cases.

According to a preferred embodiment of the invention, the diameter of the branch socket and of the milling head are greater than the diameter of the pipeline. In this way, the pipeline is completely separated and the insert for separating the flows seals relative to the branch fitting, not relative to the pipeline. In this way, the sealing surfaces can be matched optimally relative to one another.

Advantageously, the branch socket has an extension below the pipeline. This is also provided primarily to make possible the complete separation of the pipeline without the risk of damaging the branch fitting.

It is understood that the flow-guiding insert, with whose aid the fluid can be guided out of the pipeline and, after it has flown through the fluid meter, can be returned into the pipeline, is of especially great importance. This insert must ensure, for example, that no bypass flow bypassing the fluid meter can occur.

According to a first embodiment, this concerns a cylinder with an inner partition. The cylinder and partition form an inflow channel with an inlet opening aligned with the pipeline and an outflow channel with an outlet opening aligned with the pipeline. In this connection, the fluid meter can be seal-tightly positioned on the cylinder.

The cylinder and partition can be advantageously comprised of two parts insertable into one another.

According to an alternative embodiment, the flow-guiding insert has a partition and a sealing plate which is connected to the partition and closes off the branch socket, wherein the sealing plate can be inserted in the branch socket and, optionally, its extension in a fluid-tight manner. The sealing plate is open at the inflow side. At the outflow side it has a central opening which corresponds to the outlet of the fluid meter. This insert requires only minimal space so that the cross-section available for fluid flow is correspondingly large.

Preferably, the insert is sealed by means of a profiled packing in the branch socket. This profile packing comprises approximately a U-shape. U-shaped profile packings are, for example, widely used in parallel side gate shut-off valves.

According to an advantageous embodiment, the inner wall of the branch socket has guide grooves or guide strips for the partition. In this way, pressure pulses in the pipeline cannot change the position of the partition.

According to a further embodiment of the invention, a nonreturn valve is integrated into the insert, preferably directly behind the outlet of the fluid meter.

Should it be desired to measure the temperature of the fluid, a temperature sensor can be inserted into a prepared bore of the branch socket.

Should it be desired to shut off the fluid flow, a shut-off valve can be inserted at the inflow side and/or the outflow side of the branch socket. This makes it possible to exchange the fluid meter without having to use the lock fitting.

An especially simple arrangements results when the shut-off valve is an inflatable bladder. This shut-off bladder is inflated by means of a pressure pump. Emptying of the shut-off bladder is realized by the inner pressure of the pipeline.

Should it be desired to arrange a shut-off valve outside of the branch socket, it can be integrated into the sealing socket(s). For this purpose, at least one valve socket is provided in addition to the branch socket onto which the lock fitting with the milling device for drilling into and drilling through the pipeline or a valve lid can be positioned. In this connection, the valve lid has an opening for valve actuation. Construction and operation correspond to what has been explained in relation to the branch socket.

According to a first embodiment of the invention, a cylindrical plug is rotatably and seal-tightly inserted into the valve socket.

An alternative embodiment suggests a plunger valve with plunger.

The longitudinally divided sealing sockets of the branch fitting can be closed by conventional means, for example, by screws and nuts and also with clamping straps.

In order to prevent that metal shavings can be entrained by the fluid flow when drilling into the pipeline, a permanent magnet can be arranged at the milling head.

SHORT DESCRIPTION OF THE DRAWINGS

Figure 2:
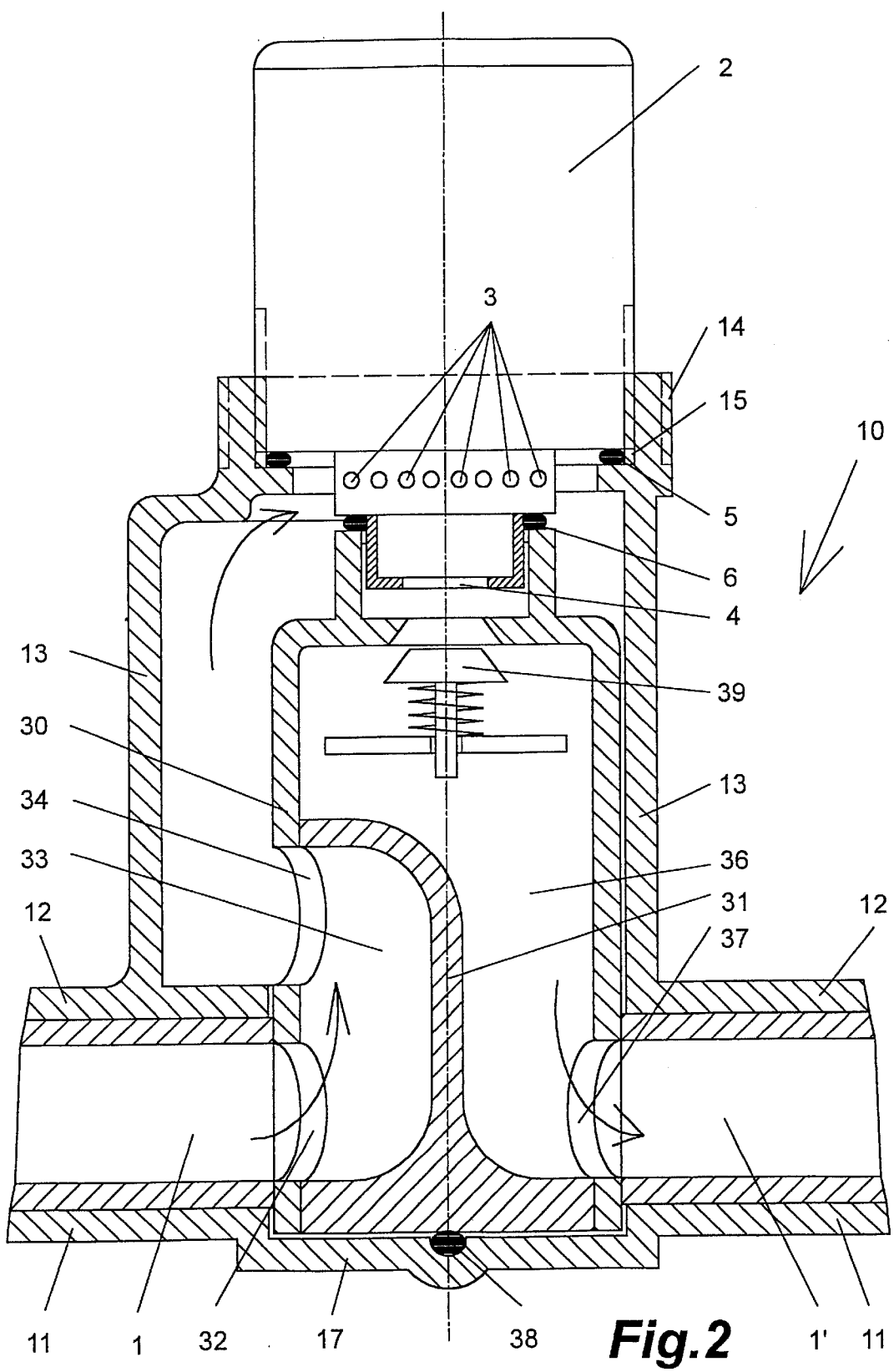
Figure 5:
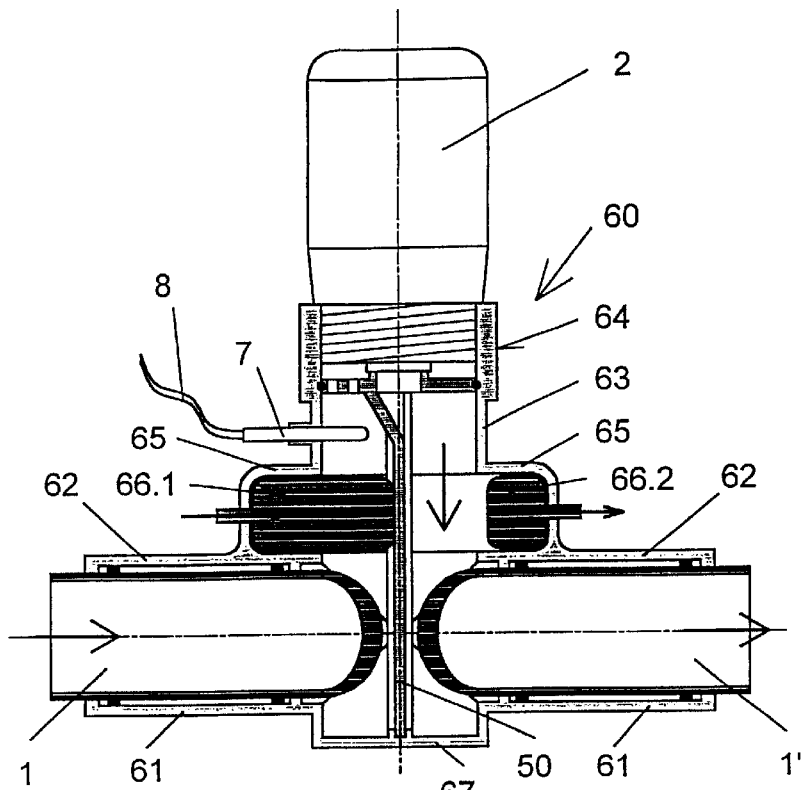
Figure 6:
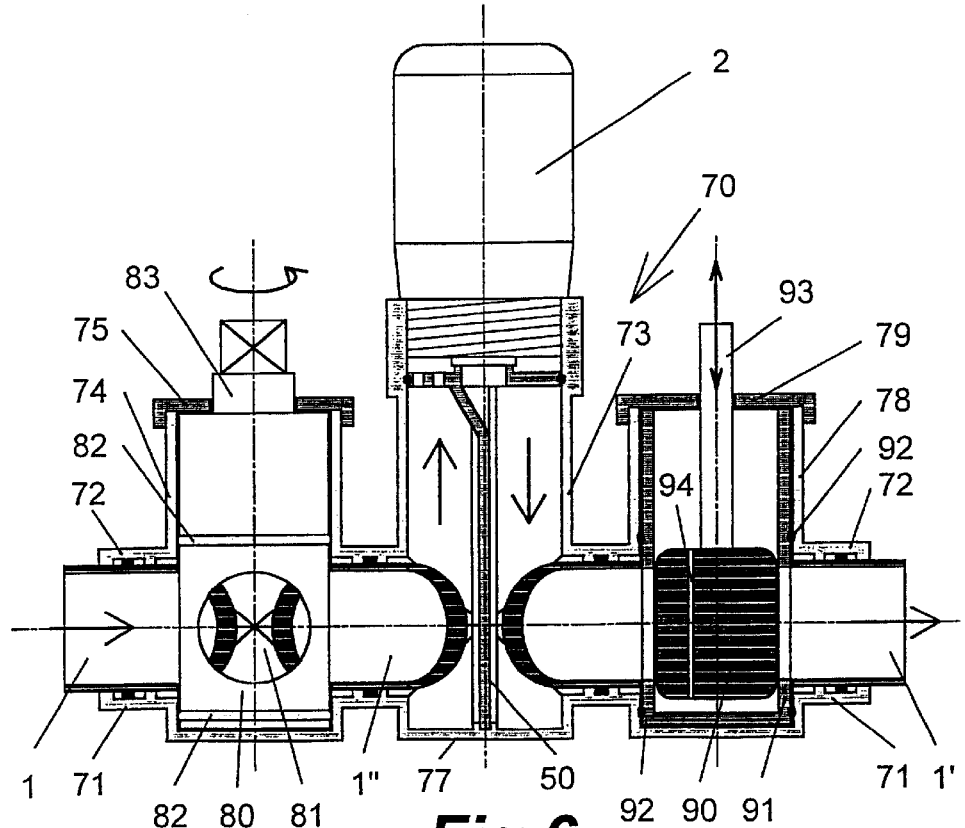

With the aid of the drawing, the invention is to be explained in more detail in the form of embodiments. It is shown schematically in, respectively:

FIG. 1 a longitudinal section of a pipeline with first branch fitting placed thereon and lock fitting placed on the latter;

FIG. 2 a detail representation on a larger scale compared to FIG. 1;

FIG. 3 a partial cross-section of a pipeline with second branch fitting placed thereon and lock fitting placed on the latter;

FIG. 4 a longitudinal section of pipeline and branch fitting of FIG. 3 with fluid meter placed thereon;

FIG. 5 a longitudinal section of a pipeline with third branch fitting placed thereon and provided with two shut-off bladders; and FIG. 6 a longitudinal section of a pipeline with fourth branch fitting placed thereon which is provided with two additional shut-off valves.

DESCRIPTION OF THE PREFERRED EMBODIMENTS

FIG. 1 shows in longitudinal section a pipeline 1, 1' on which a first branch fitting 10 is seal-tightly placed. The branch fitting 10 is comprised of two sealing sockets 11, 12 placed onto the pipeline 1, 1' in a fluid-tight manner. They are longitudinally divided along the pipe line 1, 1' so that the branch fitting 10 can be retrofitted on any pipeline. The fastening is carried out by means of screws 49 (FIG. 3), clamping straps etc.

An important element of the branch fitting 10 is a branch socket 13. It comprises an outer thread 14 and an inner thread 15. A lock fitting 20 is seal-tightly mounted on the outer thread 14. The lock fitting 20 is comprised of a cylindrical socket 21, a ball valve 23, 24, 25, and a lid 26 with guide socket 27 which can be tightly screwed on. The lock fitting 20 will be explained in more detail with the aid of FIG. 3.

In the interior of the branch socket 13 one can see a cylindrical insert 30. It comprises an inner partition 31. The fluid flowing in the pipeline 1 reaches the insert 30 through an inlet opening 32 and from there it reaches the branch socket 13. Via an outlet opening 37 the fluid exits into the continuing pipeline 1'.

In the interior of the branch socket 13 one can see the fluid meter 2 which is screwed onto the inner thread 15. The fluid meter 2 has been inserted through the open ball valve 23 of the lock fitting 20. The fluid meter 2 is sealed relative to the branch socket 13 as well as relative to the cylindrical insert 30 so that the lock fitting 20 can now be removed. In this way, the fluid is guided in the pipeline 1, 1' through the fluid meter 2 and metered.

FIG. 2 shows a partial longitudinal section of the FIG. 1 on an enlarged scale. One can see the pipeline 1, 1', the sealing sockets 11, 12, the branch socket 13, the cylindrical insert 30 with inner partition 31, inlet opening 32, inflow channel 33, outflow opening 34, with outflow channel 36 and outlet opening 37 to the pipeline 1'. One can also see the fluid meter 2 which is sealed by means of O-rings 5, 6 relative to the branch socket 13 as well as relative to the insert 30. The fluid meter 2 has a radial inflow opening 3 and a coaxial outlet 4.

Behind the outlet 4 of the fluid meter 2 a nonreturn valve 39 is integrated into the cylindrical insert 30. This prevents a possible reverse running of the fluid meter 2.

As can be furthermore seen in FIG. 2, the branch socket 13 has a short extension 17 below the pipeline 1, 1'. This extension 17 makes it possible to carry out a complete separation of the pipeline 1, 1' without damage of the branch fitting 10.

A seal 38 provides the required sealing action between the inflow side and the outflow side of the branch fitting 10.

FIG. 3 shows the pipeline 1, 1' with a second branch fitting 40 placed thereon and partially shown in section.

One can see primarily the sealing sockets 41, 42 which are separated longitudinally along the pipeline 1, 1' and are connected by means of screws and nuts 49. Sealing rings 46 (FIG. 4) provide the required sealing action.

A lock fitting 20 is tightly screwed onto the outer thread 44 of the branch socket 43. The ball valve 23 with large through opening 24, which can be opened and closed by means of an axle 25, is in the closed position. Between the ball valve 23 and the lid 26 a milling head 29 is positioned which is fastened on the actuation rod 28.

As soon as the milling head 29 has been mounted on the actuation rod 28 and the lid 26 has been tightly screwed on, the ball valve 23 is opened. The milling head 29 is moved in the downward direction via the ball valve 23 and the branch socket 43 as indicated by the positions 28' and 29'. By means of the milling head 29 the pipeline 1, 1' is then separated. The metal parts which are produced are retained by a permanent magnet integrated into the milling head 29. Since the branch fitting 40 and the lock fitting 20 are sealed on all sides, no fluid can exit.

As soon as the pipeline 1, 1' has then separated, the milling head 29 is again completely retracted. After closing the ball valve 23, the lid 26 is unscrewed and the milling head 29 is removed from the actuation rod 28. Instead of the milling head 29, holders (not shown) for the flow-guiding insert 30, 50, and the fluid meter are successively mounted.

FIG. 4 shows in longitudinal section the situation where the branch fitting 40 has been completed and the fluid meter has been mounted.

After separation of the pipeline 1, 1', first a flow-guiding insert in the form of a partition 50 with transversely positioned sealing plate 51 has been inserted into the branch socket 43 by means of the actuation rod. Securing straps 48 and profile packings (not illustrated) provide a proper sealing on all sides between the branch socket 43 or its extension 47 and the insert 50.

At the flow side, the seal plate 51 has openings 52 through which the fluid reaches the fluid meter 2. At the outflow side, the seal plate 51 has a central opening 53 which corresponds to the outflow of the fluid meter 2. In this way it is ensured that the fluid, flowing in from the pipeline portion 1, passes through the fluid meter 2 before it can reach the continuing pipeline 1'.

FIG. 5 shows a longitudinal section of a pipeline 1, 1' with third branch fitting 60 placed thereon. The branch fitting 60 corresponds substantially to that of FIG. 4. In addition, one can see however a lateral opening in the branch socket 63 through which a temperature sensor 7 with connected cable 8 can be inserted. In this way, it is possible to measure the temperature of the fluid.

In the branch socket 63 one can see furthermore, at the inflow side as well as at the outflow side, a bladder 66.1, 66.2. Both bladders 66.1, 66.2 are secured and guided by a corresponding housing expansion 65. The bladders 66.1, 66.2 can be inflated by means of a pump with the aid of a fluid, for example, air or water, until they fill the entire flow cross-section between the branch socket 63 and the flow-guiding insert 50. In this way, the fluid flow can be completely shut off so that the fluid meter 2 can be removed even without using the lock fitting 20.

Conventionally, both shut-off bladders 66.1 66.2 are inflated simultaneously in order to relieve the insert 50 with regard to force loading.

When the shut-off bladders 66.1, 66.2 are no longer needed, it is sufficient to open them. The bladders are then emptied by the inner pressure of the pipeline 1, 1'.

FIG. 6 shows also a fourth branch fitting 70 in longitudinal section. The construction in the area of the branch socket 73 corresponds to that of FIG. 4. Adjacent to the branch socket 73 one can see two valve sockets 74, 78 which are arranged in the area of the sealing socket 71, 72. These valve sockets 74, 78 are provided with an outer thread onto which either the locking fitting 20, when the pipeline 1, 1', 1" is to be separated, or a valve lid 75, 79 can be screwed in a seal-tight fashion.

In the left valve socket 74 a cylindrical plug 80 is rotatably and seal-tightly arranged. It has a transverse bore 81. By means of the actuating device 83, the plug 80 can be moved as desired into the illustrated locking position or into the open position.

As a further embodiment, the plunger valve has been seal-tightly inserted into the valve socket 78 to the right. It comprises first a cylinder 91 which by means of sealing rings 92 is sealed relative to the valve socket 78. In the cylinder 91 a plunger 90 is provided which can be moved by means of the actuating rod 93 between the illustrated locking position and the open position. A bore 94 in the piston 90 provides the required pressure relief.

I claim:

1. A device for retrofitting a fluid meter into a pipeline that is under pressure, the device comprising
a branch fitting having a branch socket,
a flow-guiding insert for guiding the fluid out of the pipeline into the fluid meter and for returning the fluid into the pipeline,
a branch socket comprising an inner thread corresponding to a thread on the fluid meter,
the branch fitting having two sealing sockets longitudinally divided along the pipeline and placeable on the pipeline in a fluid-tight manner,
the branch socket having an outer thread,
a lock fitting tightly screwable onto the outer thread of the branch socket,
the lock fitting comprising a cylinder socket, a shut-off device mounted in the cylinder socket, wherein the shut-off device comprises a ball valve with an opening movable between a closed position and an open position, a removable lid with a guide socket, and a rotatable actuation rod extending through the guide socket, therein the actuation rod is liftable and lowerable through the opening of the ball valve when the ball valve is in the open position, wherein connectable to the actuation rod is a milling head for drilling into and drilling through the pipeline to establish an opening therein such that, upon removal of the milling head through the ball valve and closing of the ball valve, the ball valve is then reopened and the flow meter and the flow guide are inserted therethrough and into the opening and removably secured to the branch socket by the inner and outer threads.

2. The device according to claim 1, wherein the branch fitting and the pipeline are of the same material.

3. The device according to claim 1, wherein the branch socket and the milling head have diameters which are greater than a diameter of the pipeline.

4. The device according to claim 1, wherein the branch socket comprises an extension below the pipeline.

5. The device according to claim 1, wherein the flow-guiding insert is comprised of a cylinder having an inner partition, wherein, when the flow-guiding insert is mounted in the pipeline, the flow-guiding insert forms an inflow channel having an inlet opening aligned with the pipeline, and an outflow channel with an outflow opening aligned with the pipeline, wherein the fluid meter is tightly placeable onto the cylinder.

6. The device according to claim 5, wherein the cylinder and the partition are comprised of two parts which are insertable into one another.

7. The device according to claim 1, where in the fluid-guiding insert comprises a partition insertable into the branch socket in a fluid-tight manner, and a sealing plate connected with the partition for closing off the branch socket, wherein the sealing plate is open at an inflow side and has at an outflow side a central opening corresponding to an outflow of the fluid meter.

8. The device according to claim 7, comprising a profile packing for sealing the partition against the branch socket.

9. The device according to claim 7, wherein the inner wall of the branch socket has guide grooves or guide strips for the partition.

10. The device according to claim 1, comprising a non-return valve integrated in the flow-guiding insert.

11. The device according to claim 1, comprising a temperature sensor inserted in the branch socket.

12. The device according to claim 1, comprising a shut-off valve mounted at least in one of an inflow side and an outflow side of the branch socket.

13. The device according to claim 12, wherein the shut-off valve is comprised of a bladder inflatable by a fluid.

14. The device according to claim 1, wherein at least one of the sealing sockets comprises a valve socket, wherein selectively placeable on the valve socket is a lock fitting with a milling device for drilling into and through the pipeline, or a valve lid having an opening for actuating the valve.

15. The device according to claim 14, wherein a cylindrical plug having a transverse bore is rotatably and sealingly mounted in the valve socket.

16. The device according to claim 14, comprising a plunger valve with plunger sealingly mounted in the valve socket.

17. The device according to claim 1, comprising screws for closing the longitudinally divided sealing sockets.

18. The device according to claim 1, comprising clamping straps for closing the longitudinally divided sealing sockets.

19. The device according to claim 1, wherein the milling head comprises a permanent magnet.

* * * * *